United States Patent [19]
Wong

[11] Patent Number: 5,416,739
[45] Date of Patent: May 16, 1995

[54] CACHE CONTROL APPARATUS AND METHOD WITH PIPELINED, BURST READ

[75] Inventor: Kenneth K. F. Wong, Richmond, Canada

[73] Assignee: Vtech Computers, Ltd., Hong Kong, Hong Kong

[21] Appl. No.: 214,783

[22] Filed: Mar. 17, 1994

[51] Int. Cl.6 ............................................. G11C 13/00
[52] U.S. Cl. ............................ 365/189.01; 365/189.05
[58] Field of Search ...................... 365/189.01, 189.02, 365/189.05, 189.04, 230.01; 364/200.07

[56] References Cited

U.S. PATENT DOCUMENTS 5,177,706  1/1993  Shinohara et al. ............ 365/189.04

Primary Examiner—Terrell W. Fears
Attorney, Agent, or Firm—Dick and Harris

[57] ABSTRACT

A cache memory controller capable of servicing pipelined multi-word read memory requests issued by a processor wherein requested data if found to be within a cache memory is bursted to the processor and wherein the servicing of a second pipelined multi-word read memory request issued by the processor overlaps in time with the servicing of a first pipelined multi-word read memory request.

4 Claims, 2 Drawing Sheets

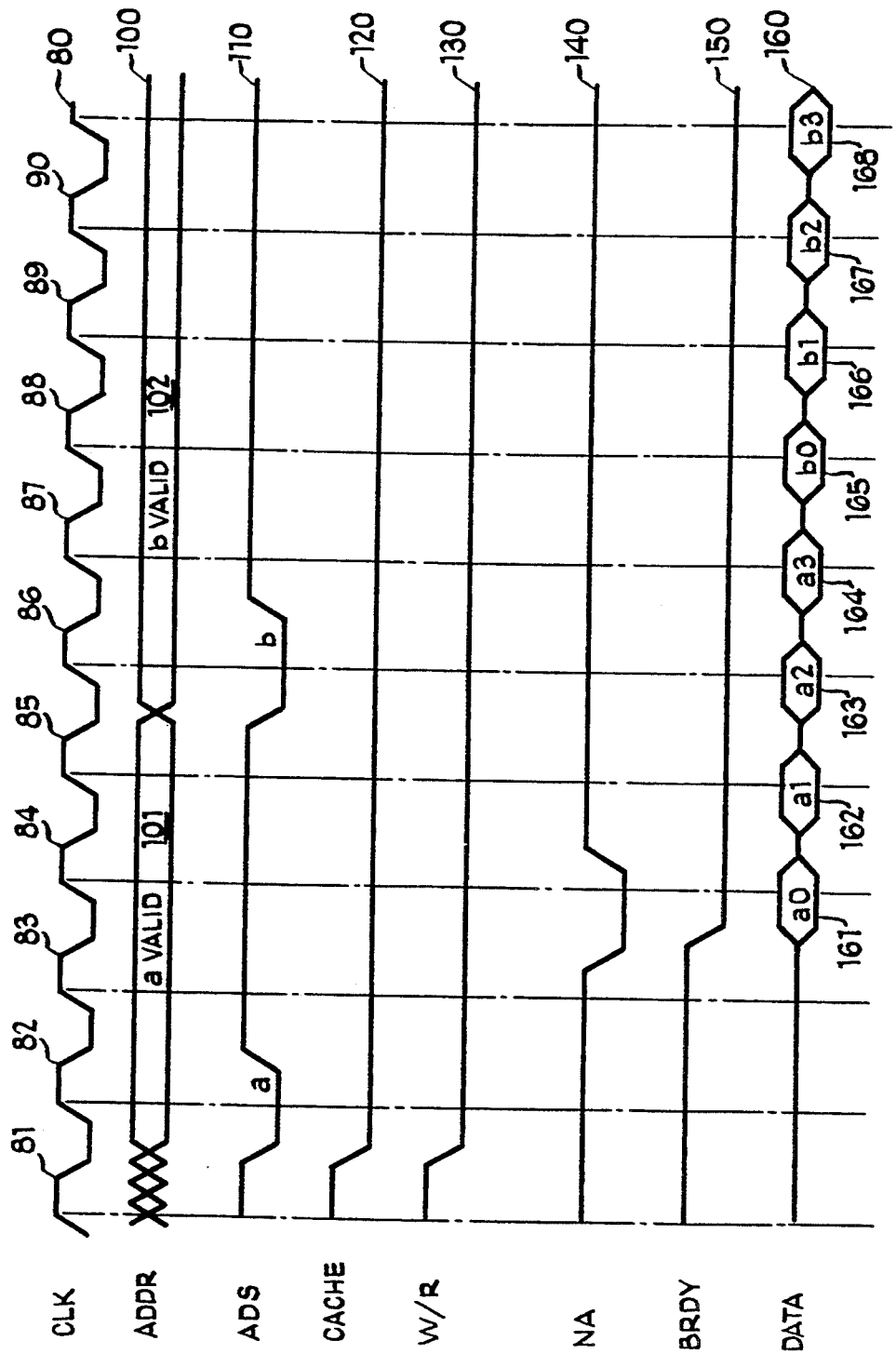

CACHE CONTROL APPARATUS AND METHOD WITH PIPELINED, BURST READ

BACKGROUND OF THE INVENTION

The present invention relates in general to cache memory controllers, and, in particular, to a cache memory controller capable of servicing pipelined memory accesses issued by a processor.

The use of a cache memory in association with a processor has become increasingly popular. Typically, a relatively small, high speed cache memory, constructed, for example, from Static Random Access Memory (SPRAM), is used in association with a larger, slower main memory, employing, for example, Dynamic Random Access Memory (DRAM). The cache memory stores a subset of the contents of the main memory —typically corresponding to the most recently accessed storage locations within the main memory.

Recently, microprocessors have been introduced which are capable of issuing pipelined memory accesses, or memory requests. An example of such a microprocessor is the P5, or PENTIUM-brand processor from Intel Corp. These processors are capable of initiating a second external memory request prior to the completion of the servicing of a first external memory request.

In general, each memory request requires several system clock cycles to be fully serviced, or completed. During a first clock cycle, a valid memory address is issued by the processor, along with control signals indicating address validity and defining the nature (i.e., read vs. write, memory vs. input/output) of the present bus cycle. Next, the cache controller will determine whether the requested data is present within cache memory. If so, (i.e., a cache read hit has occurred), the requested data will be quickly made available to the processor. If not, the requested data must be retrieved from slower main memory. In either event, a latency of at least several clock cycles typically transpires between the time the processor outputs a valid address onto its address bus and the time the requested data is presented to the processor on its data bus.

Pipelining is an attempt to make use of this latency period, by filling this otherwise "dead" time on the data bus with data associated with a first memory request which is overlapping in time with a second memory request. As a result, pipelining memory accesses results in increased system throughput, since the data bus remains idle for fewer bus cycles.

Accordingly, it is an object of the present invention to provide a cache controller capable of servicing multiple, pipelined multi-byte read requests issued by a processor to a cache memory.

It is another object of the present invention to provide a cache controller capable of bursting multiple, pipelined multi-byte read requests issued by a processor, so that servicing of a second pipelined multi-word bursted read memory request overlaps in time with the servicing of a first pipelined multi-word bursted read memory request.

These and other objects and features of the present invention will become apparent in light of the present specification, drawings and claims.

SUMMARY OF THE INVENTION

The apparatus of the present invention comprises a cache memory controller capable of servicing multiple, pipelined multi-word read memory requests issued by a processor to a cache memory containing data. The apparatus includes means for detecting a first pipelined multi-word read memory request issued by the processor during a multi-word cache memory read, and means for initiating the servicing of the first pipelined multi-word read memory request. The apparatus further includes means for determining whether data within the cache memory corresponds to the first pipelined multi-word read memory request, and means for completing the servicing of the first pipelined multi-word read memory request. The apparatus additionally includes means for detecting a second pipelined multi-word read memory request issued by the processor prior to the completion of the servicing of the first pipelined multi-word read memory request, and means for initiating the servicing of the second pipelined multi-word read memory request prior to completing the servicing of the first pipelined multi-word read memory request. The present apparatus also includes means for completing the servicing of the second pipelined multi-word read memory request. In this manner, the servicing of the second pipelined multi-word read memory request overlaps in time with the servicing of the first pipelined multi-word read memory request.

In the preferred embodiment, the means for detecting a second pipelined multi-word read memory request issued by the processor prior to the completion of servicing the first pipelined multi-word read memory request further includes means for indicating to the processor that the cache memory controller is capable of accepting the second pipelined multi-word read memory request prior to completing the servicing of the first pipelined multi-word read memory access.

The method of the present invention comprises a method of servicing multiple, pipelined multi-word read memory requests issued by a processor to a cache memory containing data. The method comprises the steps of:

detecting a first pipelined multi-word read memory request issued by the processor;

initiating a servicing of the first pipelined multi-word read memory request;

determining whether data within the cache memory corresponds to the first pipelined multi-word read memory request;

completing the servicing of the first pipelined multi-word read memory request;

sensing a second pipelined multi-word read memory request issued by the processor prior to the completion of servicing the first pipelined multi-word read memory request;

beginning the servicing of the second pipelined multi-word read memory request prior to completing the servicing of the first pipelined multi-word read memory request; and finishing the servicing of the second pipelined multi-word read memory request.

In this manner, the servicing of the second pipelined multi-word read memory request overlaps in time with the servicing of the first pipelined multi-word read memory request.

In the preferred embodiment, the step of detecting a second pipelined multi-word read memory request issued by the processor prior to the completion of servicing the first pipelined multi-word read memory request further includes the sub-step of indicating to the processor that the cache memory controller is capable of accepting the second pipelined multi-word read memory request prior to completing the servicing of the first pipelined multi-word read memory request.

BRIEF DESCRIPTION OF THE DRAWINGS

FIG. 3 of the drawings is a timing diagram, showing, in particular, the servicing of pipelined multi-word read memory requests issued by a processor.

DETAILED DESCRIPTION OF THE DRAWINGS

Figure 1:
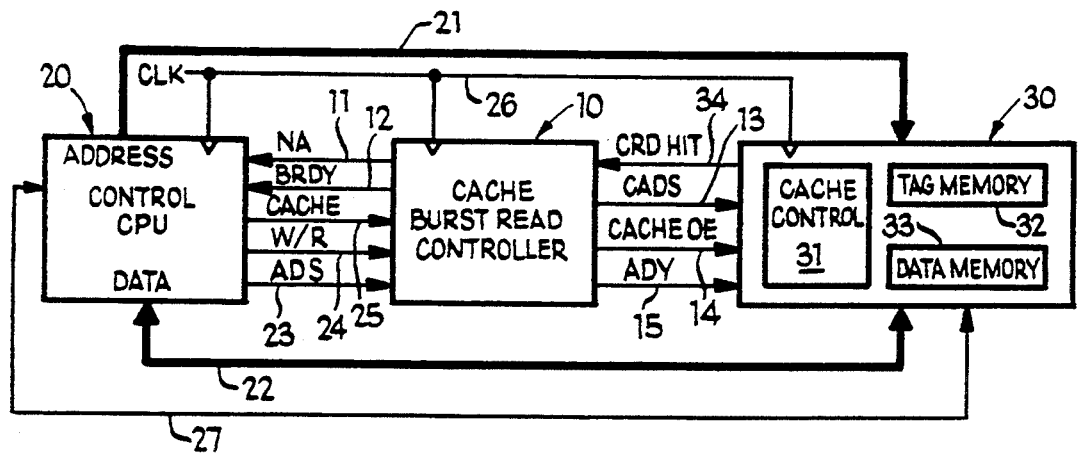
FIG. 1 of the drawings is a block diagram of the present cache memory controller incorporated into a system including a central processing unit and a conventional cache memory system.

A system including the present cache memory controller is shown in FIG. 1 as comprising a cache burst read controller 10, a central processing unit (CPU) 20, and a conventional cache memory system 30. CPU 20 is of a type capable of issuing pipelined memory requests, or memory accesses, such as the P5 or PENTIUM-brand microprocessor from Intel Corporation. Addresses are issued by CPU 20 via address bus 21 to external data memory, including data memory 33 within cache 30. An ADS 23 signal is issued by CPU 20 as an address strobe to indicate that the contents of address bus 21 are valid, and may be latched. A W/R signal 24 is issued CPU 20 to indicate whether an external memory request is a write request or a read request. A CACHE signal 25 is issued by CPU 20 to indicate that an external data memory request is internally cacheable. When CACHE 25 is asserted, and W/R 24 indicates that the present memory request is a read request, a cache line fill of a first-level cache internal to CPU 20 is to be performed, indicating that the processor is issuing a pipelined multi-word read memory request.

If the requested data is within cache 30, as indicated by cache tag memory 32 and cache control circuitry 31, cache 30 will supply the requested data to CPU 20 via data bus 22. Otherwise, if the requested data is not within cache 30 (i.e., a "cache read hit" does not occur), the requested data must be retrieved from external memory, rather than from external cache 30.

Cache burst read controller 10 monitors CPU 20 for the issuance of pipelined multi-word read memory requests. Memory requests by CPU 20 other than pipelined multi-word read requests are not handled by the present cache burst read controller 10; rather, conventional cache control circuitry 31 within cache memory system 30 handles these requests. Control lines 27 are employed between CPU 20 and cache control 31 for processing these requests. Controller 10 issues an NA signal 11 to CPU 20, indicating that controller 10 is capable of accepting pipelined memory requests (i.e., controller 10 is capable of accepting a second address of a second pipelined multi-word read request prior to the completion of servicing a first pipelined multi-word read request issued by CPU 20). In addition, controller 10 issues a BRDY signal 12 to CPU 20 indicating that the data requested by CPU is available on data bus 22.

Controller 10 also issues control signals to cache 30. In particular, a CADS 13 cache address strobe, a CACHOE 14 cache output enable signal, and an ADV 15 cache address advance signal is issued to cache 30. CADS 13 instructs cache memory system 30 to latch the address present on address bus 21. CACHOE 14 enables cache memory system 30 to output the presently addressed contents of data memory onto data bus 22. ADV 15 increments an address counter within cache control 31, so that the next sequential address within data memory 33 may be accessed during a pipelined multi-word burst access. This address counter may alternatively be located within a synchronous memory device, such as a synchronous SRAM.

Cache burst read controller 10 monitors cache control 31 for the issuance of a CRDHIT 34 signal, indicating that a cache read hit has occurred (i.e., that tag memory 32 indicates that data requested by CPU 20 is present with data memory 33). Whenever a cache read hit occurs, the requested data is provided, in burst mode, to CPU 20 from data memory 33, rather than from external memory. A common system clock 26 is presented to CPU 20, controller 10, and cache 30.

Figure 2:
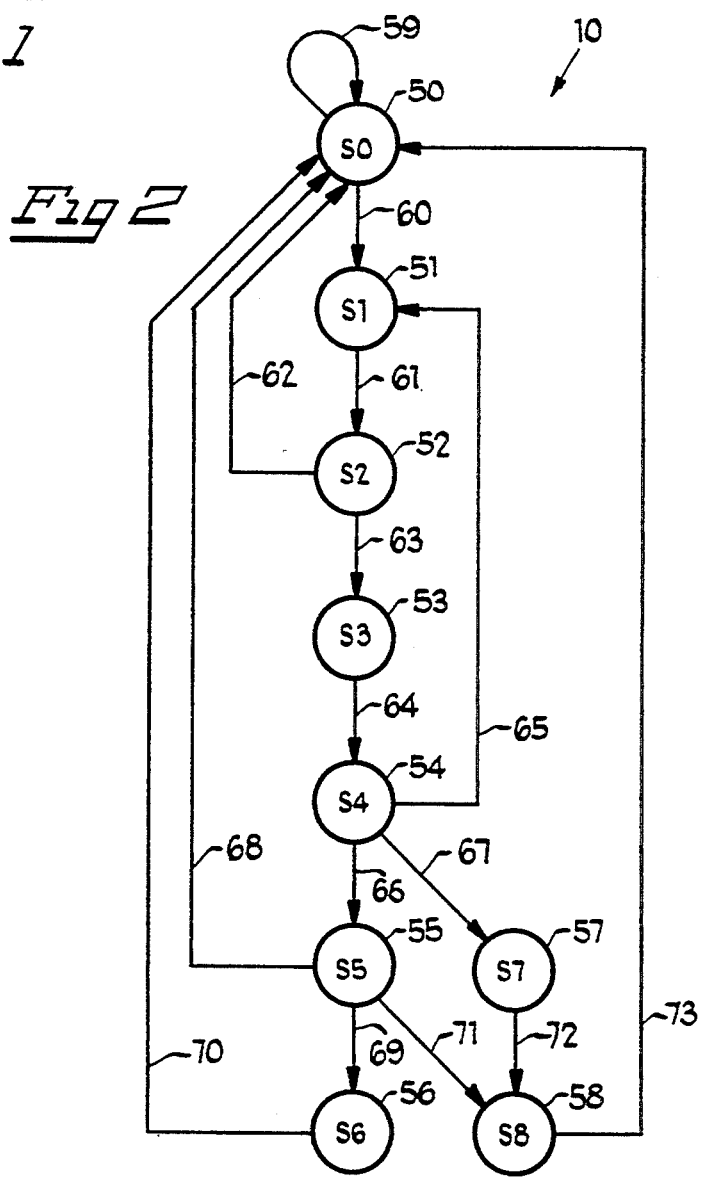
FIG. 2 of the drawings is a state diagram of the present cache memory controller.

Cache burst read controller 10 is implemented in a state machine, as shown in FIG. 2. As is known in the art, this state machine may be designed from discrete logic, or may be designed via a high level state-oriented behavioral design language, such as VHDL or VERI-LOG, or a programmable-logic base language, such as PALASM or CUPL.

Referring to FIG. 2, state S2 52 corresponds to a first transfer of a pipelined multi-word read request from the CPU. CRDHIT 34 is monitored to determine whether the present read request has resulted in a cache hit; i.e., whether the requested data is within data memory 33 and is immediately available. If not, data must be retrieved from slower, external memory, and an additional pipelined read request cannot be processed. Transition 62 is taken back to S0, the idle state. Otherwise, if a cache read hit occurs, a second memory cycle may be pipelined. NA 11 is asserted, indicating to CPU 20 that controller 10 is capable of accepting pipelined memory requests. BRDY 12 is asserted, informing CPU 20 that controller 10 will burst the present pipelined multi-word read request. By bursting the request, one word of the pipelined multi-word read request will be placed upon data bus 12 on each of four consecutive clock periods. The processor need not issue a new address for each word. Rather, a counter within cache control 31 will be incremented (by means of asserting the ADV 15 signal) to address consecutive locations within data memory 33 for the burst read. This address counter may alternatively be located within a synchronous memory device, such as a synchronous SRAM. CACHOE 14 is asserted to enable the output of cache memory 30 onto data bus 22. Transition 63 is taken to state s3 53.

State S3 corresponds to the second transfer of a pipelined multi-word, burst read memory request. CACHOE 14, ADV 15, and BRDY 12 all remain asserted. Transition 64 is taken to state S4 54.

State S4 corresponds to a third transfer of the memory request. CACHOE 14 and ADV 15 remain asserted to cache control 31, and BRDY 12 is again asserted to the processor. Within state S4, the processor is monitored to detect, or sense, whether an additional, pipelined memory request is issued. The ADS 23 signal from CPU 20 is monitored to determine whether it is again asserted, indicating CPU 20 is placing a second address on bus 21 prior to completion of the present memory request. If ADS 23 is asserted and the W/R 24 signal indicates that it is a read cycle, transition 65 will be taken to state S1, in order to initiate, or begin processing of the subsequent, pipelined memory request. If ADS 23 is asserted and signal W/R 24 indicates that the pipelined access is a write cycle, transition 67 will be taken to state S7 57. Otherwise, if no additional pipelined access occurs, transition 66 will be taken to state S5 55.

State S1 corresponds to the fourth transfer of a 4-word first burst read request, overlapping in time with a pipelined read request. Within this state, servicing of the first memory request is completed, or finished. Cache output enable signal CACHOE 14 is asserted to enable the data output from cache 30. BRDY 12 is asserted to CPU 20 to complete the current transfer. In addition, CADS 13 is asserted, indicating to cache 30 that a second, subsequent pipelined address is valid. On the next clock cycle, transition 61 is taken to state S2 52.

State S5 55 corresponds to the fourth cycle of a pipelined read cycle, wherein no additional pipelined read cycles have been issued by CPU 20. CACHOE 14 and ADV 15 remain active, and BRDY 12 is asserted to CPU 20 to complete the cache read burst. If an additional pipelined read cycle is detected at this time, transition 69 is taken to state S6 56. If an additional pipeline write cycle is detected, transition 70 will be taken state S8 58. Otherwise, transition 68 is taken back to state S0 50, the idle state.

Within state s6, transition 70 is taken back to state S0 50, the idle state.

Within state s7, CACHOE 14 and ADV 15 are asserted to cache control 31, and BRDY 12 is asserted to CPU 20 to complete the present cache read burst request. Transition 72 is then taken to state S8 58.

Within state S8 58, transition 73 is taken to state S0, the idle state. The system remains in state S0 until indication is received from the processor that it has issued a pipelined read cycle prior to the completion of a previous read cycle. This is detected upon the insertion of an additional address strobe ADS 23, with W/R 24 indicating a read access, while in the third cycle of a first 4-cycle burst read request. Upon such an occurrence, transition 60 is taken to state S1 51. Otherwise, for each rising edge of the system clock, CLK 26, transition 59 is taken, and the system remains within state S0.

A timing diagram showing pipelined bursted read accesses by CPU 20 is shown in FIG. 3. Waveform 80 shows the transitions of the system clock, CLK 26, designated as clock periods 81 through 90. Waveform 100 shows the status of address bus 21. Waveform 110 shows the address strobe signal issued by the processor, ADS 23. Waveform 120 shows the bus cycle cacheablity indication issued by the processor, signal CACHE 25. Waveform 130 shows the write/read bus cycle definition signal issued by the processor, signal W/R 24. Waveform 140 shows the "next address" signal issued by controller 10 to processor 20, signal NA 11, indicating that the controller is capable of accepting pipelined memory requests. Waveform 150 shows the burst ready signal issued by controller 10 to processor 20, signal BRDY 12, indicating that the controller intends to burst the multiple-word data requested by the CPU. Waveform 160 shows the status of data bus 22.

Within period 81, processor 20 issues a first multiple-word memory request, designated as access "a" in FIG. 3. The ADS signal transitions low, as well as the CACHE and W/R signals. Collectively, this indicates the beginning of an internally cacheable, multiple-word read request. Within time period 82, ADS transitions from low to high, indicating that the contents of the address bus, address 101, is valid, and can be latched.

Within time period 83, the NA signal is asserted to the processor by the controller, indicating that the processor is capable of servicing a second, pipelined memory request. In addition, the BRDY signal is asserted, indicating to the processor that the cache controller intends to burst the requested data. Also within time period 83, the first word of the first multiple-word request, designated word a0 161, becomes valid on the data bus. Within the next time period, designated time period 84, the second word of the first multiple-word read request, designated word a1 162, becomes valid.

Within the next time period 85, the third word of the first burst read memory request, designated word a2 163, becomes valid. In addition, processor 20 again asserts the ADS, CACHE, and W/R signals, indicating that a second, pipelined multiple-word read request is being issued. This second, pipelined read request is designated request "b" within FIG. 3.

Within time period 86, the address of the second pipelined read request, address 102, becomes valid, and the ADS signal transitions from low to high, indicating that the contents of the address may be latched. The BRDY signal remains asserted to processor 20, indicating that word a3 164, the fourth and final word of the first burst read request, is placed upon the data bus, completing the servicing of the first read memory request.

Within time period 87, the first word of the second, pipelined read memory request, designated word b0 165, is placed upon the data bus, so that it may be read by processor 20. Similarly, within time periods 88, 89, and 90, data words b1 166, b2 167, and b3 168, the second, third, and fourth data words of the second burst read memory request, respectively, are sequentially placed upon the data bus to complete the servicing of the second burst read memory request issued by processor 20.

In this manner, the servicing of the first and second pipelined multi-word read memory requests issued by processor 20 overlap in time. Accordingly, the data bus is not inactive from the time of the second assertion of the ADS signal within time period 85 through the placement of the first associated word of the second burst read memory request, b0 165, upon data bus 22. Instead, this period is "filled" with the completion of the previous burst read memory request, such that data bus 22 remains continually active and no cycles are "wasted".

The foregoing descriptions and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A cache memory controller capable of servicing multiple, pipelined multi-word read memory requests issued by a processor to a cache memory containing data, the cache memory controller comprising:

means for detecting a first pipelined multi-word read memory request issued by the processor;

means for initiating a servicing of the first pipelined multi-word read memory request;

means for determining whether data within the cache memory corresponds to the first pipelined multi-word read memory request;

means for completing the servicing the first pipelined multi-word read memory request;

means for detecting a second pipelined multi-word read memory request issued by the processor prior to the completion of servicing the first pipelined multi-word read memory request;

means for initiating the servicing of the second pipelined multi-word read memory request prior to completing the servicing of the first pipelined multi-word read memory request; and means for completing the servicing the second pipelined multi-word read memory request;

whereby the servicing of the second pipelined multi-word read memory request overlaps in time with the servicing of the first pipelined multi-word read memory request.

2. The invention according to claim 1 wherein the means for detecting a second pipelined multi-word read memory request issued by the processor prior to the completion of servicing the first pipelined multi-word read memory request further includes means for indicating to the processor that the cache memory controller is capable of accepting the second pipelined multi-word read memory access prior to completing the servicing of the first pipelined multi-word read memory access.

3. A method of servicing multiple, pipelined multi-word read memory requests issued by a processor to a cache memory containing data, the method comprising the steps of:

detecting a first pipelined multi-word read memory request issued by the processor;

initiating a servicing of the first pipelined multi-word read memory request;

determining whether data within the cache memory corresponds to the first pipelined multi-word read memory request;

completing the servicing the first pipelined multi-word read memory request;

sensing a second pipelined multi-word read memory request issued by the processor prior to the completion of servicing the first pipelined multi-word read memory request;

beginning the servicing of the second pipelined multi-word read memory request prior to completing the servicing of the first pipelined multi-word read memory request;

finishing the servicing of the second pipelined multi-word read memory request;

whereby the servicing of the second pipelined multi-word read memory request overlaps in time with the servicing of the first pipelined multi-word read memory request.

4. The method according to claim 3 wherein the step of detecting a second pipelined multi-word read memory request issued by the processor prior to the completion of servicing the first pipelined multi-word read memory request further includes the substep of:

indicating to the processor that the cache memory controller is capable of accepting the second pipelined multi-word read memory access prior to completing the servicing of the first pipelined multi-word read memory access.

* * * * *